United States Patent [19]
Edmonds

[11] Patent Number: 5,448,838
[45] Date of Patent: Sep. 12, 1995

[54] APPARATUS FOR RESTORING PLASTIC SURFACES

[75] Inventor: Frederick E. Edmonds, Columbus, Ohio

[73] Assignee: Hess, Inc., Columbus, Ohio

[21] Appl. No.: 121,684

[22] Filed: Sep. 14, 1993

[51] Int. Cl.⁶ .............................................. F26B 21/06
[52] U.S. Cl. ........................................... 34/73; 34/78; 165/63; 118/61
[58] Field of Search .................. 34/73, 78, 77; 165/63; 118/61, 64, 65; 62/47.1

[56] References Cited

U.S. PATENT DOCUMENTS

| | | | |
|---|---|---|---|
| 1,657,870 | 1/1928 | Sheets | |
| 2,209,940 | 7/1940 | Smith | 260/86 |
| 2,294,479 | 9/1942 | Peter | 117/63 |
| 2,651,811 | 9/1953 | Coney | 18/38 |
| 3,684,553 | 8/1972 | Van Dyk | 117/63 |
| 3,737,499 | 6/1973 | Kamena | 264/134 |
| 3,807,054 | 4/1974 | Joseph et al. | 34/73 |
| 4,357,295 | 11/1982 | Haddad et al. | 264/341 |
| 4,389,797 | 6/1983 | Spigarelli et al. | 34/78 |
| 4,478,781 | 10/1984 | Zaelke | 264/341 |

*Primary Examiner*—John M. Sollecito
*Attorney, Agent, or Firm*—Biebel & French

[57] ABSTRACT

An apparatus for finishing or restoring the surface of a plastic article. A receiving chamber receives the article and conveys the article to a finishing chamber. The surface of the article is exposed to a control led concentration of solvent vapor for a period of time in the finishing chamber. The solvent vapor is absorbed into the surface of the article and reforms the surface of the article to a smooth finish. The solvent evaporates off of the surface of the article leaving a smooth glass like finish. A refrigeration system condenser and evaporator are provided to respectively vaporize the solvent in a heating zone, and condense the vaporized solvent in a cooling zone.

5 Claims, 2 Drawing Sheets

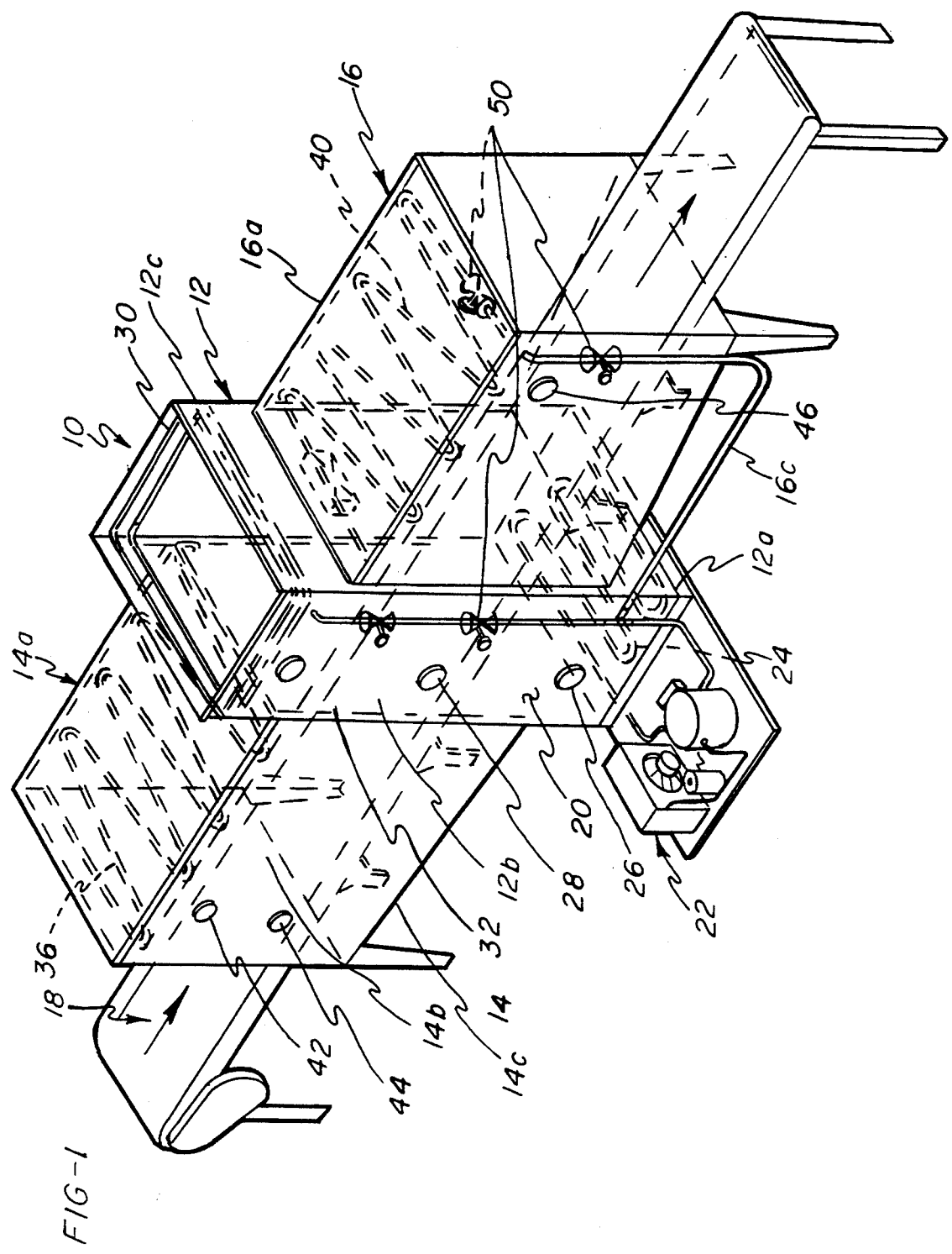

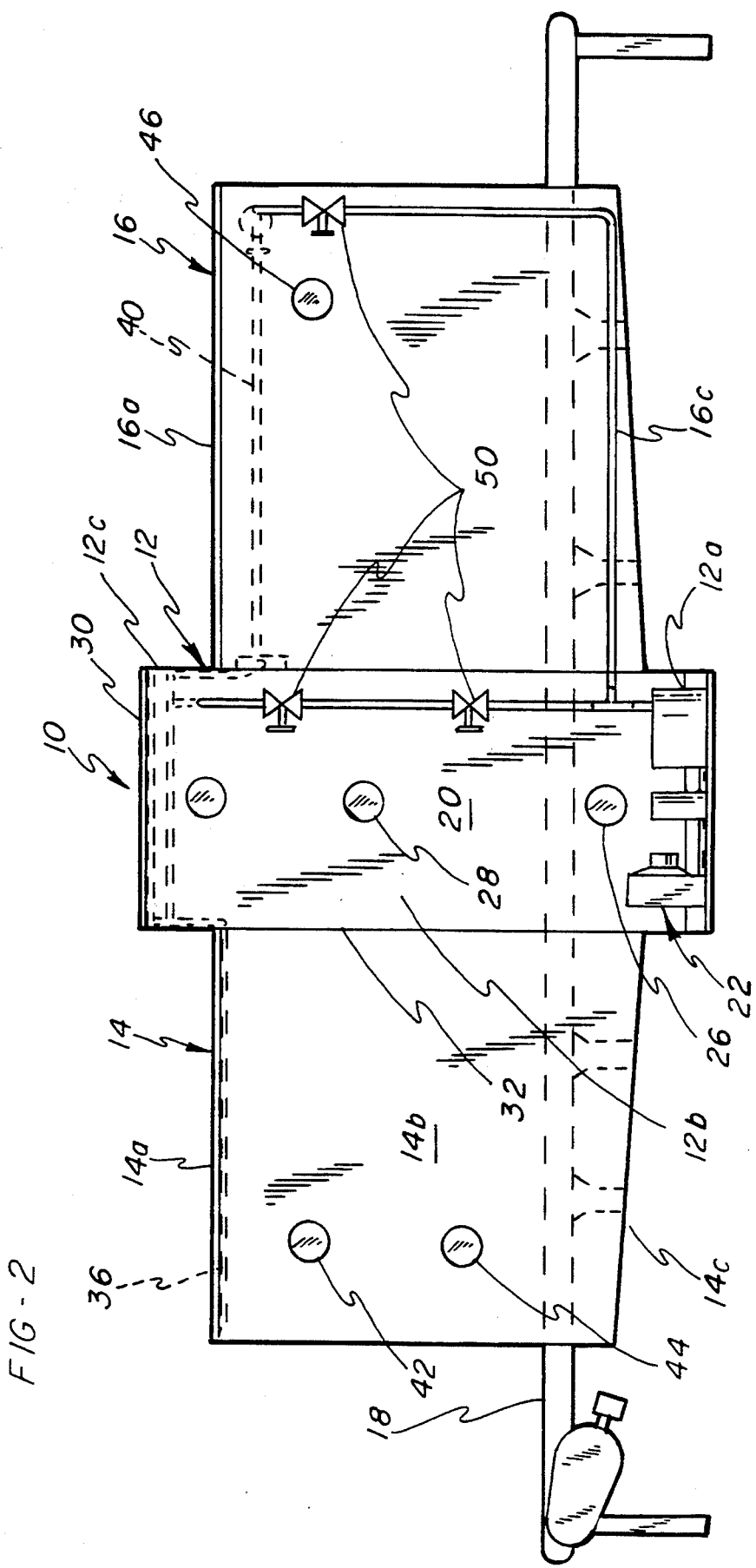

APPARATUS FOR RESTORING PLASTIC SURFACES

BACKGROUND OF THE INVENTION

The present invention relates to finishing or restoring the surface of a plastic article and more particularly to a method and apparatus for lowering the viscosity of the articles's surface, by exposing the surface to a solvent, thereby reforming the surface to a smooth finish.

In the past there has always been the problem of obtaining a smooth, high gloss finish to plastic products. Furthermore, since the advent of recycling, there is a demand for recycling or restoring plastic articles.

There have been several attempts to provide an apparatus for refinishing and reforming plastic articles. These attempts utilize various apparatus and solvents to refinish the plastic surface. One such attempt was to place an object made of plastic material into a zone of solvent vapors. The object was maintained in the zone for a sufficient amount of time for the solvent to be absorbed into the plastic's surface. The exposure of the surface to the vapor and the reaction thereto was controlled by changing the temperature of the object in relation to the zone. These past attempts did not adequately control the solvent vapor and further allowed the harmful solvent vapor to escape into the atmosphere.

Thus, there is a need to provide an apparatus and method of refinishing or finishing the surface of the plastic articles in which the solvent vapor is controlled, and which provides a high quality finish and does not release harmful gases into the atmosphere.

SUMMARY OF THE INVENTION

The present invention provides an apparatus and method, using a solvent for restoring or finishing the surface of a plastic article. The apparatus for restoring or finishing the surface of the plastic article controls the exposure of the surface to a finishing solvent. The apparatus has a finishing chamber for containing the solvent, controlling the solvent temperature, and exposing the surface to the solvent in a contact zone during a predetermined period of time.

A vaporizer in the finishing chamber vaporizes the solvent. The solvent vapor is conveyed to the contact zone. The finishing chamber has receiving and exiting ends for receiving the plastic article and removing the plastic article from the finishing chamber. The surface of the plastic article is exposed to the solvent vapor in the contact zone. Cooling coils, positioned at the top of the finishing chamber, cools the solvent vapor that rises above the contact zone. The cooling of the solvent vapors lowers the vapors back into the contact zone. The concentration of the solvent vapor in the contact zone is maintained by the cooling coils or vaporizer.

Attached to the receiving end of the finishing chamber is a receiving chamber for receiving and conveying the plastic through the contact zone of the finishing chamber. Attached to the exiting end of the finishing chamber is an exiting chamber for removing the plastic article from the finishing chamber once the surface of the plastic article is finished. A conveyor passes through the receiving, finishing and exiting chambers for conveying the plastic article therethrough. The receiving and exiting chambers capture any of the solvent vapor that escapes from the finishing chamber. The exiting chamber also captures the solvent vapor that evaporates off of the surface of the plastic article once the article is removed from the finishing chamber.

The invention also comprises a method of finishing the surface of the plastic article including the steps of vaporizing the solvent and conveying the solvent vapor into the finishing chamber. The concentration of solvent vapor is controlled in the finishing chamber by changing its temperature so that the solvent vapor is at predetermined concentration at the contacting zone in the finishing chamber. The plastic article to be treated is conveyed into the contacting zone in the finishing chamber and exposed to the solvent vapor for a predetermined amount of time so that the solvent is absorbed by the surface of the article. The absorbing of the solvent vapor lowers the viscosity of the surface and reforms the surface.

Once the predetermined time has expired the article is removed from the contact zone and the finishing chamber. When the plastic article is removed from the finishing chamber the solvent is allowed to evaporate off of the surface of the plastic article in the exiting chamber. After the solvent has evaporated the plastic article has a smooth finish for appropriate subsequent use thereof.

One object of the present invention is to provide an apparatus and method for restoring or finishing the surface of a plastic article to a smooth glass-like finish.

Another object of the present invention is to provide an apparatus and method which contains the solvent and prevents the releasing of the solvent into the atmosphere.

Other objects and advantages of the present invention will be apparent from the following description the accompanying drawings and the appended claims.

BRIEF DESCRIPTION OF THE DRAWINGS

FIG. 1 is a perspective view of the apparatus for finishing plastics of the present invention; and FIG. 2 is an elevational view of the apparatus for finishing plastics.

DESCRIPTION OF THE INVENTION

Initially, when a plastic article's surface is exposed to a solvent or solvent vapor, such as methanol, the solvent is absorbed into the surface of the article. The absorbed solvent lowers the viscosity of the first few molecular layers of the surface of the plastic. By lowering the viscosity, the surface of the plastic article will flow due to the surface tension of liquid. This flowing allows any blemishes or scratches in the surface to be eliminated thereby forming a smooth surface.

Preferably the surface will be exposed to a particular concentration of solvent vapor for a period of time such that the surface will flow to eliminate any defects on the surface and yet not flow excessively or become opaque due to over exposure to the solvent vapor.

Generally, referring to the drawings, the finishing apparatus of the present invention is designated as 10. A finishing chamber 12 is positioned between a receiving chamber 14 and an exiting chamber 16. The plastic article to be restored or finished will enter the finishing apparatus 10 on a conveyor 18 through receiving chamber 14. The conveyor 18 conveys the article into the finishing chamber 12 where it is exposed to the solvent for a predetermined amount of time. Once the predetermined time has expired the article will exit through exiting chamber 16.

The finishing apparatus 10 will remove scratches, mars or other imperfections from the surface of old plastic, such as Lexan, or will provide a finishing process for the manufacturing of new plastic articles, such as those made out of acrylic, resulting in a smooth glass-like finish. It should be noted that any type of plastic can be finished using the finishing apparatus of the present invention.

More specifically, referring to FIGS. 1 and 2, the finishing chamber 12 has three zones, defined by phantom lines 11, a heating zone 12a, a contact zone 12b and a cooling zone 12c. The heating zone 12a contains the liquid solvent to be used for restoring or finishing the article.

Preferably the solvent used in the finishing chamber 12 is methanol. It should be understood that any other solvent that lowers the viscosity of plastic can be used, such as, but not limited to, chloroform, acetone, methyl acetone, etc. and ether alcohol.

The solvent 20, located in the heating zone 12a is heated to a predetermined temperature, such as 150° F. This heating vaporizes the solvent 20. The heating of the solvent 20 may be provided by a heating coil 24. The heating coil 24 may be the high end of a cooling compressor 22, such as a R502 cooling unit manufacture by the Copeland Corporation, Model MSYOL-0035-IAA. The high end of the cooling compressor 22 will sufficiently heat the liquid solvent 20 until it evaporates.

It should be understood that any type of heating device may be used to heat the liquid solvent 20 in the heating zone 12a, but it is preferred that the high end of the cooling compressor be used due to its efficiency. Such heating devices can include, but not limited to, electric heating coils, oil heating coils or simply a gas burner placed underneath the heating zone 12a of the finishing chamber 12.

The solvent vapor 20b, having a temperature of approximately 140° F., will rise from the heating zone 12a into the contact zone 12b where it will contact the surface of the article entering into the finishing chamber 12 through receiving end 12r. The solvent vapor 20b will rise above the contact zone 12b into the cooling zone 12c of the finishing chamber 12.

Cooling or evaporator coils 30 of the cooling unit are positioned in the cooling zone 12c to cool the solvent vapor 20b that has raised above the contact zone 12b. Based on the principle that hot vapor rises and cool vapor descends, the cooling coils cool the solvent vapor 20b and lowers the solvent vapor out of the cooling zone 12c back into the contact zone 12b. Thus, by heating and cooling the solvent vapor the concentration of the solvent vapor in the contact zone 12b can be regulated and contained.

It should be noted that there is a direct relationship between the temperature of the solvent vapor and the concentration of the solvent vapor in the contacting zone. Thus, if the solvent vapor, such as methanol, is maintained at a predetermined temperature, such as to 110° F., the concentration of the solvent vapor will be sufficient for lowering the viscosity of the surface for reforming the surface of the article.

As part of the cooling process the cooling coils 30 capture a portion of the solvent vapor by condensing the solvent vapor back into a liquid. The condensed solvent flows downs the walls 32 of the finishing chamber 12, returns back to the heating zone 12a and is reheated and vaporized. The process of heating, cooling and condensing the solvent is continuous throughout the finishing of the article such that the proper conditions are provided for finishing the article in the contacting zone 12b.

The temperature of the solvent 20 and the solvent vapor is controlled and regulated by temperature indicators and controls. Temperature indicator 26 is positioned in the heating zone 12a to continually monitor the temperature of the solvent. Temperature indicator 27 located in the cooling zone, continually monitors the temperature of the solvent vapors in the cooling zone 12c.

The temperature indicators 26 and 27 are preferably Johnson Controls temperature indicators Model Number D350AA-1 which outputs a temperature ranging from −30° F. to 250° F. The signal from the temperature indicator 26 is used to regulate and control the heating of the liquid solvent 20 by the heating coils 24 and the cooling of the solvent vapor 20b by cooling coils 30 in the cooling zone 12c.

A temperature control 28, such as a Penn Control Model Number A350AA-1 is used to regulate the temperature of the heating coils 24 and the cooling coils 30 based upon the readings from the temperature indicators 26 and 27. The temperature control 28 may be regulated to decrease or increase the temperature of the cooling coils 30 in order to maintain the temperature in the cooling zone within the desired range for finishing the article's surface.

For example, if plastic is being finished through the finishing chamber 12 by using methanol, then the temperature of the solvent vapor in the contact zone 12b should be controlled at a temperature range between 20° F. and 140° F. The temperature of the heating coils 24 and cooling coils 30 can be microprocessor controlled.

In order to facilitate the finishing process, receiving 14 and exiting chamber 16 are used to continually convey the article to be finished, or restored, into and out of the finishing chamber 12. The receiving chamber 14 is attached to the finishing chamber's receiving end 12r with the conveyor 18 running therethrough for carrying the article into the contacting zone 12b of the finishing chamber 12. The top portion 14a of the receiving chamber 14 captures any of the solvent vapor 20c that escapes from the finishing chamber 12.

Located at the top of the receiving chamber are cooling coils 36 for condensing the escaped solvent vapor 20c into a liquid. These cooling coils 36 are connected to the cooling unit 18 compressor 22. The condensed liquid solvent runs down side walls 14b to the bottom 14c of the receiving chamber 14. The bottom wall 14c is sloped down towards the heating zone 12a of the finishing chamber 12 and directing the condensed solvent back into the finishing chamber 12 to the heating zone 12a.

A temperature indicator 42, such as the Johnson Controls Model D350AA-1, and a temperature control 44, such as the Penn Control Model A350AA-1, monitors the temperature of the receiving chamber. The temperature in the receiving chamber 14 is controlled through solenoid valve 50 such as Sporlan Controls Model A3F1, and a back pressure regulator 54 constant pressure such as a Sporlan Controls Model ORIT 658050. The valve 50 and the regulator 54 regulates the temperature to insure the proper capturing and condensing of the escaped solvent vapor 20c from the finishing chamber 12.

Similar to the receiving chamber 14, the exiting chamber 16 is attached to the finishing chamber 12 for conveying the finished article out of the finishing chamber 12 through exit 12e. The conveyor 18 extends through exit 12e and the exiting chamber 16 to convey the article out of the finishing chamber 12. The top portion 16a of the exiting chamber 16 captures any solvent vapor 20d that escapes from the finishing apparatus 10. Furthermore, the exiting chamber 16 captures the solvent 20e that evaporates off of the article exiting the contacting zone 12b.

Located at the top 16a of the exiting chamber 16 are cooling coils 40 for condensing the escaped 20c or evaporated 20e solvent vapor. The cooling coils 40 are connected to the compressor 22 of the cooling unit. As in the receiving chamber 14 the condensed liquid solvent runs down side wall 16b into bottom wall 16c of the exiting chamber 16. The condensed liquid solvent is directed back into the finishing chamber's heating zone 12a for vaporization by the sloped bottom wall 16c.

As in the receiving chamber 14, a temperature indicator 46, such as the Johnson Controls Model D350AA1, monitors the temperature of the exiting chamber 16. A solenoid valve 50, such as a Sporlan Controls Model A3F1, and a back pressure regulator 54, such as a Sporlan Control Model ORIT 658050, controls the cooling of coils 40 to insure the proper capturing and condensing of the escaped and evaporated solvent vapor from the finishing chamber 12. The temperature control 44 controls both the receiving 14 and exiting chambers 16 temperature.

As stated above, the temperature indicator and temperature controls of the receiving 4 and exiting 16 chambers can be linked to a microprocessor in order to maintain the appropriate level of solvent vapors in the contacting zone 12b.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for finishing the surface of a plastic article with vapors of a solvent for such plastic article surface, comprising:

a finishing chamber in which such article is subjected to such solvent vapors for refinishing said article surface, said finishing chamber having means therein containing such solvent and having a lower solvent heating zone, an intermediate article contact zone, and an upper cooling zone, heating coils positioned in said heating zone and cooling coils positioned in said cooling zone, a refrigeration compressor unit having a hot high pressure end and a condensor end, said condensor end including said cooling coils for cooling said vapor in said finishing chamber, and said high pressure end including said heating coils for heating such solvent to form such solvent vapors in said article contact zone for refinishing such plastic articles.

2. The apparatus of claim 1 further comprising a receiving chamber for receiving such article, the surface of which is to be refinished, said receiving chamber opening into said finishing chamber, and additional cooling cools positioned in said receiving chamber to condense said vapor therein, said additional coils connected to said finishing chamber cooling coils.

3. The apparatus of claim 2 further comprising an exiting chamber for receiving a finished article from said finishing chamber, said finishing chamber opening into said exiting chamber so that such article may pass from said finishing chamber into said exiting chamber, said exiting chamber having still further cooling coils therein for condensing said vapor, said still further cooling coils connected to said finishing chamber cooling coils.

4. Apparatus for finishing the surface of a plastic article with vapors of a solvent for such plastic article surface, comprising:

a receiving chamber for receiving such article, the surface of which is to be refinished, a finishing chamber in which said article is subjected to such solvent vapors for refinishing said article surface, and an exiting chamber for receiving a finished article from said finishing chamber, said receiving chamber opening into said finishing chamber and said finishing chamber opening into said exiting chamber so that such article may pass from said receiving chamber into said finishing chamber and from said finishing chamber into said exiting chamber, said finishing chamber having means therein containing such solvent and having a lower solvent heating zone, an intermediate article contact zone, and an upper cooling zone, heating coils positioned in said heating zone and cooling coils positioned in said cooling zone, a refrigeration compressor unit having a hot high pressure end and a condensor end, said condensor end including said cooling coils for cooling said vapor in said finishing chamber, and said high pressure end including said heating coils for heating such solvent to form such solvent vapors in said article contact zone for refinishing such plastic articles.

5. The apparatus of claim 4 comprising additional said cooling coils positioned in said receiving chamber and in said exiting chamber, said additional said cooling coils connected to said finishing chamber cooling coils.

* * * * *